C. W. ROSENTHAL.
SAVINGS BANK LEDGER CARD.
APPLICATION FILED DEC. 19, 1910.
1,017,915.
Patented Feb. 20, 1912.
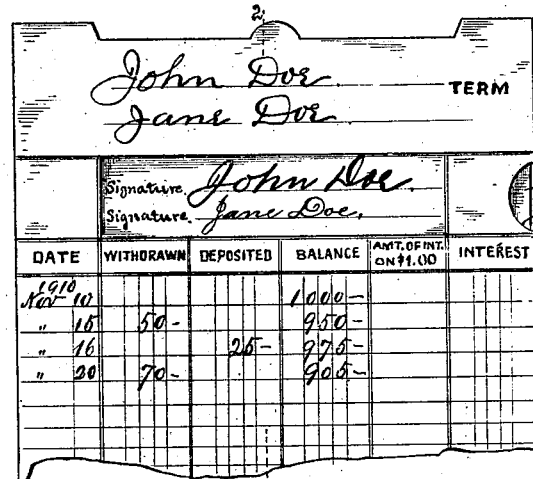
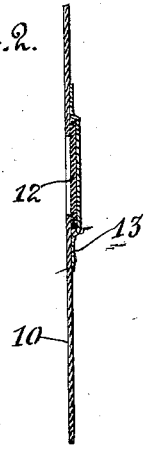
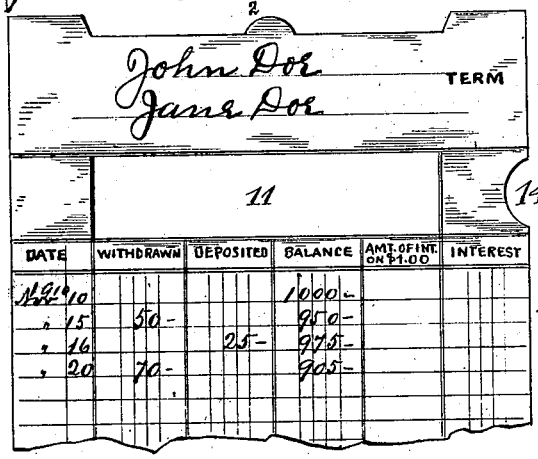
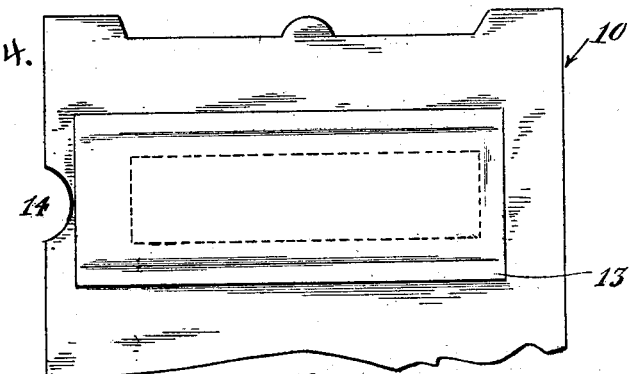
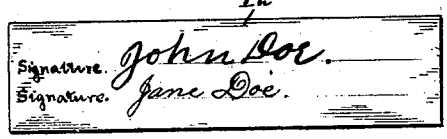
Inventor,
Charles W. Rosenthal,
By G. W. Orpham
Attorney.
Witnesses,

UNITED STATES PATENT OFFICE.

CHARLES W. ROSENTHAL, OF LOS ANGELES, CALIFORNIA.

SAVINGS-BANK LEDGER-CARD.

1,017,915.  Specification of Letters Patent.  Patented Feb. 20, 1912.

Application filed December 19, 1910. Serial No. 598,043.

*To all whom it may concern:*

Be it known that I, CHARLES W. ROSENTHAL, a citizen of the United States, residing in the city of Los Angeles, county of Los Angeles, State of California, have invented new and useful Improvements in Savings-Bank Ledger-Cards, of which the following is a specification.

In savings banks the accounts of the different customers are kept in a pass book, which is carried by the customer and on a ledger card, which is kept by the bank. When a customer opens an account in the bank, his signature is taken upon a verification signature card, which is kept in a suitable drawer or receptacle which is deposited each day back of and as near as possible to the teller's window, who has charge of the account of such customer, there usually being a single signature card receptacle for several tellers. The amount that such customer deposits is entered on what is called a ledger card, which is suitably ruled. This ledger card has at the top thereof the name of such customer, and the kind of account. The amount of the deposit is entered in the deposit column and the date of such deposit is entered in the date column and the balance in the balance column. The customer is given a pass book in which corresponding entries are made. When the customer deposits other amounts entries are made in the pass book and on the ledger card. These ledger cards are kept in suitable receptacles at the side of the teller's window. When a customer desires to draw money from the bank, he makes a check on the bank and presents his pass book. The teller must then consult the ledger card to ascertain whether or not the customer has the necessary funds to his credit. The balance on the ledger card gives the information. When a ledger card is filled, it is filed away and the balance is carried to a new card. It frequently happens that the teller is not acquainted with the customer or with his signature. In order to determine whether the signature on the check is correct he must take the check to the signature drawer and compare the signature on the check with the signature on the signature card, taken at the time the account was opened.

My invention relates to improvements in these ledger cards, and the object thereof is to provide a ledger card with the genuine signature of the customer, so that the teller of the bank may ascertain without leaving his window whether the customer's balance is good for the amount of the check and at the same time determine whether the signature on the check is the genuine signature of the customer opening the account. I accomplish this object by the card described herein and illustrated in the accompanying drawings forming a part hereof in which:

Figure 1 is a front view of my improved ledger card. Fig. 2 is a section on the line 2—2 of Fig. 1. Fig. 3 is a front view of the card, without the signature pocket or the signature card. Fig. 4 is a rear view of the card after the signature pocket has been pasted thereon. Fig. 5 is a detached signature slip.

In the drawings 10 is an ordinary ledger card, such as are in ordinary use in the savings banks. Near the top of the card as shown in Fig. 3, I cut out an aperture 11, which is wide enough and long enough to disclose to view the signatures on the signature card 12, which is held in place by a strip of paper 13, which is pasted on the back of the card near to and along both edges and at one end of the aperture and passes across the opening so as to form a pocket in which the signature card is held, as shown in Figs. 1 and 2. This slip of paper is ruled to correspond with the ruling on the other portions of the card so that no portion of the back of the card need be wasted. At the right hand edge of aperture 11, the body of the card is cut out to form a thumb notch 14, as shown in Fig. 3, to permit the signature slip to be withdrawn from the pocket when desired.

As shown by the foregoing description, my improvement consists of a signature slip pocket, the face of which is open and is cut out of the ledger card near the top thereof, in which pocket is inserted a signature slip containing the genuine signatures of the customers and that the opening in the ledger card is narrower and shorter than the signature slip. When the account is opened the customer is required to write his signature upon the usual verification signature card, which contains certain private information furnished by the customer in addition to his signature. In addition to the verification signature card, the customer also writes his name upon a signature slip, which can be slipped into and out of the signature pocket in the card. This signature pocket is formed near the top of the face of the card preferably, but if desired can be formed in any other part of the card. When the customer presents a check to be cashed the teller has on his ledger card the amount of the balance due the customer and also the genuine signature of the customer. He therefore determines at a glance whether the amount is sufficient to meet the check and also whether the signature on the check corresponds with that on the signature slip which shows on the face of the card, thus saving the ordinary time consumed in going to the signature drawer to verify the signature of the customer. In addition to the time saved, he also prevents the customer from knowing that it has been necessary for him to compare the signature on the check with the signature taken at the time the account was opened, thereby inspiring more confidence in the customer in the efficiency of the teller than he would have had, had the teller been compelled to go to the usual verification signature card drawer to compare the signatures. By the formation of the signature slip pocket in the face of the card, all danger of the signature becoming defaced through the ordinary handling of the card is obviated. By forming the signature pocket through cutting out a portion of the card and putting on a paper back a cheaper and less bulky pocket is provided, than if a metallic pocket were provided for the signature slip to be attached to the card. As the paper back, which forms the rear portion of the signature slip pocket is of ordinary writing paper and is pasted to the card, when the signature slip is removed from the pocket, the pocket adds very little additional thickness to the card, so that the card can be filed away without occupying any appreciable additional bulk by reason of the signature slip pocket. In the drawings, I have not shown the back of the card ruled as the ruling would obscure the drawings. In practice however the back of the card is ruled as well as the front.

If desired the opening through which the signatures are inspected could be formed in the piece of paper that is pasted upon the card to form with the card the signature slip pocket. In the drawings I have shown a signature slip pocket for use in an account containing two signatures. Where the account contains only one signature a narrower opening in the signature slip pocket would be provided and a correspondingly narrower pocket would be made.

Having described my invention what I claim is:—

1. A ledger card having a signature pocket near the top of the card, said pocket being partly formed by the card and being open at one end and having an opening in the side of the pocket in that portion thereof which is made by the card, said pocket being wider and longer than the opening in the card.

2. A ledger card having a narrow opening therein near the top thereof, said opening extending from near one edge to near the other edge of the card; in combination with a strip of paper secured to the back of said card near the said opening except at one end thereof, said paper passing across said opening and forming with the card a signature slip pocket, said pocket being wider and longer than the opening in the card.

3. A ledger card having a signature slip pocket, said pocket having an open end and an opening in the face of the card in combination with a signature slip adapted to be inserted in said pocket by being pushed through the open end of the pocket.

4. A ledger card having a signature slip pocket with an opening in the face of the card and a thumb notch at one end of the pocket in combination with a signature slip adapted to be inserted in said pocket by being pushed in the open end of the pocket, said slip being wider and longer than the opening in the card.

In witness that I claim the foregoing I have hereunto subscribed my name this 12th day of December, 1910.

CHARLES W. ROSENTHAL.

Witnesses:
G. E. HARPHAM,
R. S. STEARNS.